United States Patent [19]

Irani

[11] Patent Number: 6,024,167
[45] Date of Patent: Feb. 15, 2000

[54] TRANSPORTING WATERFLOOD MOBILITY CONTROL AGENTS TO HIGH PERMEABILITY ZONES

[75] Inventor: Cyrus A. Irani, 7718 Stonesdale, Houston, Tex. 77095

[73] Assignee: Cyrus A. Irani, Houston, Tex.

[21] Appl. No.: 09/079,761

[22] Filed: May 15, 1998

Related U.S. Application Data

[60] Provisional application No. 60/046,609, May 15, 1997.

[51] Int. Cl.$^7$ .................................................. E21B 43/22
[52] U.S. Cl. ...................... 166/270; 166/270.1; 166/294
[58] Field of Search .................................. 166/292, 294, 166/295, 270, 270.1, 270.2

[56] References Cited

U.S. PATENT DOCUMENTS

| | | | |
|---|---|---|---|
| 2,866,507 | 12/1958 | Bond et al. ................................. | 166/9 |
| 3,082,822 | 3/1963 | Holm et al. ............................. | 166/274 |
| 3,126,952 | 3/1964 | Jones ....................................... | 166/274 |
| 3,196,944 | 7/1965 | Bernard et al. .......................... | 166/273 |
| 3,212,575 | 10/1965 | Fisher et al. ............................. | 166/274 |
| 3,354,953 | 11/1967 | Morse ......................................... | 166/9 |
| 3,356,138 | 12/1967 | Davis, Jr. et al. ....................... | 166/274 |
| 3,435,898 | 4/1969 | Thompson ............................... | 166/274 |
| 3,570,601 | 3/1971 | Dauben et al. .......................... | 166/273 |
| 3,616,858 | 11/1971 | Raza ........................................ | 166/274 |
| 3,847,722 | 11/1974 | Kistner .................................... | 161/109 |
| 4,532,052 | 7/1985 | Weaver et al. .......................... | 252/8.55 |
| 4,569,393 | 2/1986 | Bruning et al. ......................... | 166/270 |
| 4,609,043 | 9/1986 | Cullick .................................... | 166/268 |
| 4,629,000 | 12/1986 | Hurd ....................................... | 166/274 |
| 4,640,361 | 2/1987 | Smith et al. ............................. | 166/288 |
| 4,643,255 | 2/1987 | Sandiford et al. ...................... | 166/295 |
| 4,785,883 | 11/1988 | Hoskin et al. ........................... | 166/270 |
| 4,828,029 | 5/1989 | Irani ....................................... | 166/268 |
| 4,844,163 | 7/1989 | Hazlett et al. ........................... | 166/270 |
| 4,899,817 | 2/1990 | Djabbarah ............................... | 166/252 |
| 4,903,767 | 2/1990 | Shu et al. ................................. | 166/270 |
| 4,913,235 | 4/1990 | Harris et al. ............................ | 166/273 |
| 4,921,576 | 5/1990 | Hurd ....................................... | 166/252 |
| 4,945,989 | 8/1990 | Irani et al. .............................. | 166/268 |
| 4,945,990 | 8/1990 | Irani et al. .............................. | 166/268 |
| 4,947,933 | 8/1990 | Jones et al. ............................. | 166/263 |
| 5,095,984 | 3/1992 | Irani ....................................... | 166/268 |
| 5,413,177 | 5/1995 | Horton .................................... | 166/294 |
| 5,421,410 | 6/1995 | Irani ....................................... | 166/294 |

FOREIGN PATENT DOCUMENTS

| | | |
|---|---|---|
| 2 145 784 | 10/1996 | Canada . |
| 2 248 463 | 8/1994 | United Kingdom . |
| 2 291 082 | 10/1997 | United Kingdom . |

OTHER PUBLICATIONS

L.W. Holm, "The Mechanism of Gas and Liquid Flow Through Porous Media in the Presence of Foam" Presented to the Society of Petroleum Engineers, Houston, Texas, Oct. 1–4, 1967.

J.P. Heller, et al, "Mobility Control for $CO_2$ Floods A Literature Survey" New Mexico Institute of Mining and Technology, Socorro, New Mexico, Oct., 1980.

F.M. Orr Jr. et al, "$CO_2$ As Solvent for Oil Recovery" Chemtech, Aug., 1983.

John P. Heller et al, "Development of Mobility Control Methods to Improve Oil Recovery by $CO_2$", New Mexico Energy Research and Development Institute, Feb., 1984.

S.S. Marsden, "Foams in Porous Media—Supri TR–49", Stanford University Petroleum Research Institute, Stanford, California, Jul., 1986.

C.A. Irani et al, "Slim–Tube Investigation of $CO_2$ Foams", Society of Petroleum Engineers and the Department of Energy, Tulsa, Oklahoma, Apr., 1986.

Cyrus A. Irani, SPE 27701 "Transporting Mobility Control Agents to Thief Zones" Presented to the Society of Petroleum Engineers Permian Basin Oil and Gas Recovery Conference, Midland, Texas, Mar. 16–18, 1994.

*Primary Examiner*—William Neuder
*Assistant Examiner*—Zakiya Walker
*Attorney, Agent, or Firm*—Haynes and Boone, L.L.P.; Rita M. Irani

[57] ABSTRACT

A method for improving the a real sweep efficiency of a waterflood process is described. Reservoir heterogeneity results in the waterflood being diverted to the thief zones, bypassing much of the in-place hydrocarbon fluids. Existing remedial options are sensitive to water chemistry and temperature and are mostly effective near the wellbore. The unique advantages of this process is that it is insensitive to the water phase, in-depth in its placement, and can be triggered by pressure change which no other existing process offers. The process works by dispersing a low viscosity gas like plugging solution in the injected water phase, the dispersed plugging solution phase being a combination of some solvent phase like carbon dioxide, or light hydrocarbons, or mixtures of the same, in which a very high viscosity solute like a polymer is dissolved the composition of the dispersed plugging solution phase can be adjusted so that it is essentially homogeneous when injected with the aqueous phase and offers no additional resistance to the injection or movement of the water phase through the reservoir. However, as the water phase with dispersed plugging solution penetrates the reservoir rock, increasing temperature or decreasing pressure, or a combination of the two causes the plugging solution phase to destabilize releasing a gas and leaving behind a liquid like phase of increasing viscosity. This dispersed phase of increasing viscosity can be expected to plug the pore throats of the reservoir rock through which the water phase is flowing, and this increased resistance to flow will cause the waterflood to bypass the plugged zones to access larger volumes of the reservoir rock.

12 Claims, No Drawings

TRANSPORTING WATERFLOOD MOBILITY CONTROL AGENTS TO HIGH PERMEABILITY ZONES

CROSS-REFERENCE TO RELATED APPLICATIONS

This application claims the benefit of priority under 35 U.S.C. §120 from U.S. Provisional patent application Ser. No. 60/046,609, filed on May 15, 1997.

SPECIFICATION

1. Field of the Invention

This invention relates to the delivery of mobility control agents to high permeability thief zones during waterflood processes. In particular, this invention relates to the delivery of permeability reducing agents for the purpose of enhancing the oil recovery characteristics of a waterflood drive when injected into subterranean formations.

2. Background of the Invention

Only a portion of the oil originally present in a subterranean oil-bearing formation is recovered during the primary production cycle. During primary production only the natural pressure present in the formation is exploited for oil recovery. Waterflooding is the most commonly used secondary recovery process. Injection of water into strategically located wells serves to revive formation pressure and to physically displace oil present in the subterranean formation. However, large volumes of the original in-place hydrocarbons, in some instances as much as 50%, still remain trapped in the reservoir even after waterflooding.

A significant additional consideration is the role played by reservoir heterogeneity, usually in the form of high permeability streaks between injectors and producers that tend to take the bulk of the injected water. By offering a path of least resistance for the injected water, these high permeability thief zones lead to early breakthrough of water, poor areal sweep, poor oil recovery, and costly water recycle processes. Clearly, some mechanism for providing in-depth resistance to water flow through thief zones is highly desirable.

Almost exclusively the approach taken to address this problem is to inject a water soluble polymer with the water phase, together with some means for further polymerizing the injected polymer, or crosslinking it using a chemical trigger to form a significantly viscous gel which will retard the flow of the water. Numerous computer simulations have demonstrated that if any reasonable resistance to water flow could be generated in-depth, then the diverted waterflood would access economically significant volumes of additional oil.

In reality, for some narrow range of applications it is feasible to define a water soluble polymer based application that can provide reasonable in-depth plugging for diversion purposes. However, from a practical standpoint most of these polymer systems show a significant water and temperature sensitivity. The salinity, pH, and nature and concentration of the ionic species dissolved in the injected water can significantly influence the success of a polymer crosslinking process. Because the crosslinking step requires a catalyst, it tends to be quite temperature sensitive, and consequently temperature limited in that above a certain temperature, usually in the range of 150° F., the process speeds up significantly so that any in-depth application proves unfeasible. For all of these reasons the bulk of the waterflood diversion applications are limited to near wellbore treatments where high viscosity gels can be easily and reasonably successfully placed. Only in a limited number of applications where water salinity, temperature, and chemical complexity of the crosslinking step are controllable can an in-depth waterflood diversion program using crosslinked water soluble polymers expect to meet with any success. Clearly, there is need for some alternate in-depth waterflood diversion process that is simple, robust, easily implemented, and temperature and water insensitive.

Another insignificant consideration in the implementation of such in-depth diversion processes is the triggering mechanism for activating the process. Primarily there are three triggers for activating a potential plugging mechanism: temperature, pressure, or some chemical entity or chemical change in the characteristics of the continuous water phase. Considering each in turn, the reservoir temperature is not easily or quickly influenced due to the large heat sink that the reservoir rock represents. Consequently, the reservoir temperature is treated as a given which must be compensated for or exploited as appropriate. The chemical trigger tends to be quite unreliable due to dilution, chromatographic partitioning, and adsorption losses. Pressure represents a very simple and feasible trigger, as localized pressure changes can be implemented by either pumping up or drawing down on a reservoir system. Unfortunately, there are no commercially available plugging systems that utilize the pressure trigger. Consequently, it is the intent of this invention to present a novel pressure triggered system that is simple to implement, robust in performance, and augmented by temperature increases that will attend the penetration of the plugging medium deeper into the reservoir.

The novel process to be presented has its roots in an earlier perceived need by the petroleum industry to develop a methodology for the direct viscosification of improved oil recovery gases like carbon dioxide. One of my early U.S. Pat. No. 4,913,235, which is incorporated herein by reference, teaches a method for directly viscosifying the injected solvent by the addition of a polydimethyl siloxane type polymer and a cosolvent such as toluene. The direct viscosification process described in U.S. Pat. No. 4,913,235 is effective in countering the adverse areal sweep resulting from a viscosity difference between injected solvent and reservoir fluids, but will be relatively ineffectual in minimizing the preferential movement of the injected solvent through the high permeability zones. Moreover, correct implementation of the teachings of U.S. Pat. No. 4,913,235 requires that substantial volumes of the injected solvent, at least 25% and up to 50%, needs to be viscosified using cosolvent and polymer in order to capture the beneficial effects of improved sweep through improved mobility control. This combination of large volumes to be injected and high cost of cosolvent and polymer for viscosity enhancement destroys any economical advantage generated from improved oil recovery through improved mobility. Consequently, even though the technology for mobility control through direct viscosification of the injected solvent phase is available, it has never been implemented in practice.

A recent patent of mine (U.S. Pat. No. 5,095,984), which is also incorporated herein by reference, bypassed the poor economics of direct viscosification and focused instead on the plugging of thief zones. The premise taken is that because thief zones divert such large volumes of injected gas, any success with plugging a thief zone will substantially improve areal sweep efficiency of the injected fluid. The concomitant improvement in oil recovery and reduced recycling costs represents a substantial economical incentive for pursuing such an approach. An additional advantage stems from the fact that such remedial treatment requires only small volumes of chemicals injected over short periods of time, and consequently will prove very cost effective.

The process described in U.S. Pat. No. 5,095,984 works by the simple expediency of dissolving a solute in a gas phase, incorporating the use of a cosolvent as necessary to aid in the solubilizing step. The fundamental improvement introduced was to prepare a mixture such that it would be just one phase at the temperature and pressure conditions at which the mixture would be injected into the reservoir, but would destabilize as the temperature of the mixture increased or the pressure fell, to deliver a more viscous plugging phase. In actuality, in a reservoir environment both increasing temperature and decreasing pressure will attend the penetration of the plugging fluid as it moves away from the injector into the reservoir. As such, this technology offers remarkable flexibility and diversity in its means of application. In a carbon dioxide flood, the inclusion of a cosolvent like toluene allows the dissolution of highly viscous polydimethyl siloxane polymers, and the solution composition can be adjusted so that the polymer is one phase when injected into the reservoir but can be destabilized to deliver a plugging polymer phase with a decrease in pressure, or an increase in temperature, or a combination of both. On the North Slope of Alaska where a full 25% of America's oil is produced, an enriched gas phase called Miscible Injectant (MI) is injected in place of more conventional displacement gases like carbon dioxide for improved oil recovery purposes. For a number of reasons unique to the North Slope environment, the MI is enriched in ethane and propane and other higher molecular weight hydrocarbons. This combination makes it an excellent solvent for the polymer severely limiting the need for additional cosolvents, and greatly simplifying the introduction of this polymer phase into the flowing MI phase.

In a different application altogether this technology is being evaluated to address the problem of gas migration after primary cementing of well bores. Because of physical and chemical forces at work, the cement sheath placed between the casing and formation tends to shrink and microfine cracks are formed through which gas can migrate either between subsurface formations, or between some subsurface formation and the surface. The presence of this gas gives rise to pressure behind the casing which represents both an environmental and an explosion hazard. At the heart of the problem is the fact that most of these fractures are so fine they will only take a gas like substance. Understandably, the teachings of U.S. Pat. No. 5,095,984 offer an ideal solution for this gas migration problem. In one application a carbon dioxide type carrier gas is envisioned to carry the plugging agent down the production tubing to the lowest perforations from which it is anticipated that the injected mixture will access the gas migration channels and flow in them to the surface. Along the way the pressure on the mixture will fall, or can be artificially lowered by releasing pressure at the surface connections to the casing. This drop in pressure will cause the mixture to destabilize and drop a viscous phase that will block further gas migration.

In a more elegant version it is anticipated that the appropriate plugging agent will be dissolved in a light hydrocarbon such as propane or butane or ethane etc., or mixtures of these light hydrocarbons, or mixtures of light hydrocarbons and inert gases like nitrogen or carbon dioxide, or methane, or mixtures of the same, the light gases being added to the system to further lower the viscosity of the injected phase and for appropriate adjustments to the phases behavior of the system as might be required for any particular application.

This mixture can also be injected down the tubing string as with the above identified example, or it can be placed into the head space at the top of the cement sheath and forced by pressure to penetrate the migration channels in the downward direction. Once this mixture has penetrated a sufficient distance down these migration channels, the pressure at the surface can be released to allow the light hydrocarbon solvents and added gases to escape, leaving behind a very viscous plugging phase.

What is apparent from the above discussion is that the technology is now available for very simple and elegant in-depth plugging process that is pressure triggered, and it is the intent of this disclosure to incorporate this process into a waterflood operation to develop an in-depth sweep improvement methodology for waterfloods that meets the requirements for simplicity, robustness, and insensitivity to the water phase earlier cited.

DETAILED DESCRIPTION OF THE INVENTION

This invention deals with improving the performance of a waterflood drive. Water is usually injected into an oil producing formation to maintain reservoir pressure during the oil production step, and also as a displacement medium to physically move oil out of the reservoir once the primary recovery process stalls. The problem with all such displacement processes is that the underground reservoir tends to be heterogenous, in the sense that instead of being a uniform permeability it has streaks of high permeability which act like thief zones. Because all injected fluids will find the path of least resistance, these high permeability streaks offer convenient channels for the injected displacement fluid to proceed directly from the injector to the producer, bypassing significant portions of the reservoir. Not only is the oil bypassed, but the declining oil production means that more and more of the injected fluid has to be recycled at not insignificant cost, and the process quickly becomes uneconomical.

Clearly, there has been a longstanding need for technology that will address this issue of poor sweep efficiency of the injected solvents, and understandably many approaches have been tried. It has also been demonstrated that the more in-depth the diversion process can be delivered, the greater the improvement in the sweep efficiency that is generated, and the larger the volume of the in-place oil that can be produced. Unfortunately, because of the complex nature of the processes tried and the inherent problems of a field environment, most diversion techniques for waterflood processes tend to be near wellbore and chemically or thermally triggered. In fact my earlier patent U.S. Pat. No. 5,095,984 is perhaps the only pressure triggered mechanism available for delivering a plugging agent. Because a continuous water phase has a high compressibility, it is possible to drop the pressure on a water phase with minimal amounts of work expended. Consequently, it is the intent of this invention to teach a method for combining a gas type plugging agent sensitive to pressure changes with a waterflood operation where pressure changes are feasible.

EXAMPLE 1

A working of this invention can be understood by the following example. A mixture of say 80 wt. % carbon dioxide +10 wt. % cosolvent such as toluene +10 wt. % of a 600,000 cSt. polydimethyl siloxane polymer is prepared as has been routinely done in the past and reported on in a number of my earlier patents. Such a system is known to have a phase transition pressure in the vicinity of 1750 psia in the temperature range between 65 and 70° F. Such a mixture can be used in a hypothetical waterflood being injected at 1750 psia and at a constant reservoir temperature of 70° F. by including it in the injected water phase and allowing it to be dispersed in the water phase. Because the starting viscosity of this dispersed phase is quite low, less than 1 cP while the water is 1 cP or higher, the dispersed phase will offer no resistance to the flow of the water phase through the rock matrix.

However, as this dispersion penetrates the reservoir, the pressure will fall slowly as is always the case between an injector and the reservoir in-depth. This pressure drop can be further accentuated by curtailing water injection while continuing to produce the formation. This imbalance will send a pressure pulse through the water phase, the intensity and duration of which will be dictated by the permeability of the reservoir and the production rate. Certainly, in the high permeability thief zone the response will be seen faster and will be more pronounced than in the bulk of the reservoir where the permeability is lower. The thief zone will also have taken the bulk of the injected phase with the dispersion present because that response is inherent to the performance of the waterflood in the presence of thief zones.

Once the pressure falls below the phase transition pressure, a second phase will form in each droplet of the dispersion. The further the pressure falls, the greater will be the difference in properties between the two phases, and very quickly a low viscosity gas phase will break out from the original dispersion, leaving behind a second dispersed phase of increasing viscosity. It is this second viscous phase in suspension that will provide the necessary resistance to the flow of the continuous waterflood. The increasing viscosity or the dispersed particles means that eventually they will lodge at pore throats and by virtue of their viscosity offer sufficient resistance to flow through the pore throat as to force the bulk water phase to find alternate channels.

From a usage standpoint such a system should prove extremely efficient because the plugging mechanism is only activated at pore throats and the bulk of the water phase where no additional viscosity is needed remains relatively unaffected. This is in contrast to a more conventional mobility control program where all the water is treated with polymer because there is no way to arbitrarily separate the water soluble polymer phase from the continuous water phase.

Because a waterflood will require more resistance than a low viscosity gas flood, it is important to generate as much viscosity as possible in the dispersed phase with minimum adjustment of pressure. There are two ways the viscosity of the dispersed phase can be affected and they will be presented here. In the first instance the approach taken should exploit the highest viscosity polymer available. Whereas the bulk of the prior work has been done using a 600,000 cSt polymer, there is commercially available a 1 million cSt polymer that will be more appropriate for this application. Previous work has already demonstrated that there is no significant solubility or transportation difference between the 600,000 and 1 million cSt polymer in such gas continuous systems even though a much more viscous delivered phase can be expected. there are even higher viscosity materials referred to as gums that can be in the 2 million cSt range that could be useable for this application.

The other approach to speeding the viscosity response of the dispersed phase is to alter the starting ratio of the components. From a gas mobility standpoint a system that is 80 to 90 wt. % gas with the rest made up by plugging agent and cosolvent as needed is a reasonable ratio though it may be altered as necessary for a specific type of gas phase application. This is because the bulk injected phase is a gas and it might not prove desirable to have the small slug of treated gas phase to have properties too diverse from the bulk gas that will precede and follow the injected slug. However, when the bulk injected phase is water, mixtures that are much richer in polymer are feasible, because even though the viscosity of the dispersed phase starts to exceed 1 cP and the density of the dispersed phase approaches 1 g/cc, these properties are not out of line with the bulk water phase and should pose no problems from a dispersion and injection standpoint.

We have already observed that if the gas phase is sufficiently enriched with light hydrocarbons, for example a mixture that is about 35 mole % methane, 20 mole % carbon dioxide, 20% ethane, 20 mole % propane, and the rest made up of butane and heavier components, then mixtures as rich as 65 wt. % gas and 35 wt. % plugging agent such as the 600,000 cSt polymer are readily prepared. Furthermore, whereas the 90 wt. % gas case for the above mixture tends to be a dew point system in the sense that as the pressure drops or the temperature increases the phase that separates out is a lower more viscous liquid phase comprising polymer enriched with gas, below about 75 wt. % gas the systems tend to be bubble point systems, in the sense that the first phase that separates out tends to be an upper gas phase which leaves behind a large volume of liquid phase enriched with plugging agent. Furthermore, we have also demonstrated that in the case where the carrier gas is propane, the systems tend to be continuous in that all ratios of gas and plugging agent are miscible. Consequently, for this application it would be appropriate to dissolve the highest viscosity plugging agent in the highest concentration of carrier phase to make a dispersion that is still compatible with the properties of the bulk continuous water phase. Furthermore, if the composition of this mixture is adjusted such that it is just one phase at the injection point, any drop in pressure will start to release a low viscosity gas phase from a higher viscosity plugging phase, and because of the nature of the plugging mixture and the higher starting viscosity of the dispersed phase, the viscosity of this plugging phase can be expected to rise rapidly as the dispersion penetrates further into the reservoir and is subject to a greater pressure drop. Significantly, the low viscosity gas phase that is released will have a higher mobility than the more viscous plugging phase and will separate from and move ahead of the plugging phase to give rise to additional diversion of the water phase by representing a gas phase for permeability variation.

EXAMPLE 2

This example is very similar to the one presented above with a significant difference in that surfactants are exploited to both stabilize the starting dispersion and considerably increase the viscosity of the dispersed phase once phase transition starts. The nature of surfactants and the role played by surfactants can be readily ascertained by one skilled in the art, and any multitude of treatise and review articles are available for developing the necessary understanding of the subject. Further to the purpose of this discussion, a surfactant is any component capable of concentrating at the interface separating immiscible phases. A detailed description of the role and interaction of miscible drive solvents, cosolvents and surfactants applicable to the teachings of this invention is presented in U.S. Pat. No. 4,828,029 and incorporated herein by reference. This present patent application compliments U.S. Pat. No. 4,828, 029 by teaching a method that improves the performance of a waterflood by including surfactants to stabilize the starting dispersion in the continuous water phase injected into the reservoir, and to assist in increasing the tenacity and durability of the plugging action delivered by the dispersed phase once the system falls below some threshold stabilization pressure.

In the first instance of stabilizing the injected dispersion, the surfactant need only be some routine chemical readily effective at stabilizing a gas phase in a continuous water phase. Furthermore, the choice of the surfactant will be dictated in large part by the chemical properties of the water, and can be expected to be water soluble, though a gas phase soluble surfactant using the mechanism presented in U.S. Pat. No. 4,828,029 is not out of the question, the final choice being easily made by one skilled in the art. What is important for the teachings of this patent is that the effective surfactant will serve to both decrease the size of the dispersed phase and increase its stability for the same degree of mixing as would be observed if no surfactant were present.

The need to decrease the size of the dispersed phase and stabilize it is readily apparent from some of the arguments offered above. Keeping in mind that optimal consumption of plugging agent will be achieved by having each pore throat blocked by one viscous droplet of dispersed material, with no additional dispersed phase being present as all dispersed material in the bulk water phase not plugging a pore throat is wasted. Unfortunately, in reality it is unlikely that such an ideal system can be prepared, but nevertheless, the closer the starting dispersion is to a finely and widely dispersed system, the more optimally will the polymer be used for plugging the porous media. The presence of a surfactant will assist greatly in optimizing the dispersion and utilization of the plugging phase.

To understand the crucial role a surfactant can play in improving the tenacity and durability of the plugging mixture it is important to try and visualize the fashion in which the various phases are formed and the fashion in which they dissipate as the pressure is lowered. Let us say for example that the dispersed phase is the mixture presented in the above example, comprising a rich gas phase of composition 35 mole % methane, 20 mole % carbon dioxide, 20 mole % ethane, 20 mole % propane, and the rest made up of butane and heavier components, and a polymer phase wherein the polymer is a 600,000 cSt viscosity polydimethyl siloxane system. Let us also assume that the gas and polymer are combined in a ratio that is 65 wt. % gas and 35 wt. % polymer, and we know that this system on lowering pressure will give us a bubble point system, i.e. an upper low viscosity gas phase will separate from a lower high viscosity liquid phase. Let us also presume that the reservoir for which this application has been formulated is at 160° F. and 2500 psia, but the injectors are at 68° F. and 3000 psia. Based on our experience with such systems we know that at the conditions of the injectors this mixture is one phase, but that at the condition of the reservoir it is distinctly two phase, and consequently this represents an ideal mixture for the waterflood diversion mechanism under discussion.

Now let us follow the behavior of the system as the temperature and pressure change. Based on previous studies we know that the mixture is marginally one phase at the injector conditions, namely 68° F. and 3000 psia, and consequently any increase in temperature or decrease in pressure will destabilize the mixture. Consequently, as the mixture penetrates the formation and the pressure falls, a gas phase is evolved from the mixture to leave behind a slightly more viscous liquid phase, and each successive decrease in pressure or increase in temperature will generate more gas and a more viscous liquid phase. But what is significant the standpoint of this invention is that the gas is all released from the lower liquid phase, and as the pressure keeps falling and the temperature keeps rising, more gas is released from a more viscous phase until a strong foaming action is observed as the viscosity of the lower phase becomes high enough to retard gas release.

It is the intent of this patent to teach the use of a surfactant compatible with the lower phase that will assist this foaming action, cause more consistent and persistent foams to form at earlier stages in the destabilization process, and allow for extremely persistent foams to form at the later stages of the destabilization process. all of these effects will serve to generate more plugging action earlier and minimize the amount of dispersed plugging phase initially required. the amount of dispersed phase required will be minimized because by this mechanism all the volume expansion of the dispersed phase due to gas release will be salvaged in the form of a foam, and this foam will be stabilized by the viscous nature of the liquid phase being generated by the gas release. the more gas that is released, the more viscous the liquid phase becomes, and the more persistent the foams that will be formed.

To identify the proper surfactant for this application it is necessary to turn to the teachings of U.S. pat. No. 4,828,029 as it applies to the identification and solubilization of appropriate surfactants in these types of systems. Specific examples of surfactants that might be applicable without in any way limiting the choice of surfactants, are a number of chemicals available for example in a brochure titled "Fluids, Emulsions, and Specialties Materials and Applications" put out by GE Silicones, which identifies their silicone products and other chemical entities compatible with them. Specifically, three chemicals identified as polyethers are indicated to be compatible with the polydimethyl siloxanes. These are identified in the brochure by Product Numbers SF1188A, SF1288, and SF1328, any one of which would be a potential candidate for dissolution in the solute phase, with the expectation that it will stay behind with the polymer as the gas phase is evolved and form more rigid foams as additional gas is released.

EXAMPLE 3

In another interesting variation, the continuous aqueous phase could be an acid solution. Quite often acid is injected into the formation at injectors or producers for the express purpose of near wellbore cleanup. Injected waters often contain scale producing chemicals, or pick them up in the process of moving between injector and producer wells. The formation in the vicinity of a wellbore represents a bottleneck in that all the fluid being injected or produced must enter or leave the formation through that constriction. If the permeability of either region is adversely affected by the deposition of scale or other acid soluble material, then the productivity of either the injection or the production operation is comprised and remedial action becomes crucial. The usual remedy is to inject acid to dissolve the deposited scale and thereby reopen the flow channels for more substantial injection or production action. Unfortunately, once the acid opens up a particular channel into the bulk of the reservoir, that channel becomes the path of least resistance that takes the additional acid being injected. this channel needs to be plugged, and as this action takes place in the vicinity of the wellbore, a pressure trigger to activate the plugging step will be easy to implement and almost immediate in its impact.

It should be obvious that the methodology described above will be equally applicable for this problem. As pointed out earlier, this is a near wellbore effect and hence pressure would be an immediate and potent trigger for activating the phase transition to generate the desired plugging action as described above. The fact that the polymer is unaffected by the acid works strongly in favor of this method. the fact that the polymer is soluble in hydrocarbon systems means that this process can be used to plug a zone for acid diversion and then flushed with solvent to open up all the zones for enhanced production or injection.

The foregoing disclosure and description of the invention are illustrative and explanatory thereof, and various changes in the size, shape and materials, as well as in the details of the illustrated construction may be made without departing from the spirit of the invention.

What is claimed is:

1. An improved method for recovering oil from a subterranean, hydrocarbon-bearing formation which is penetrated by at least one injection well for injection of aqueous displacement fluids into the formation, the injection well having perforations for communication of fluids between the injection well and the formation, the improvement comprising the steps of:

providing in the aqueous displacement fluid a dispersed gas phase to act as a plugging agent, wherein the viscosity of the gas phase increases when subjected to an increase in temperature and viscosity which increases when subjected to a decrease in pressure and which viscosity is between about one and about five centipoise at the temperature and pressure conditions near the injection well perforations; and dispersing the plugging agent in the displacement fluid prior to injecting the aqueous displacement fluid containing the plugging agent through the injection well perforations.

2. The method of claim 1 wherein the plugging agent is a non-aqueous mixture of one or more solvents selected from the group comprising carbon dioxide, nitrogen, and light hydrocarbons having a carbon number of from 2 to 20 and a solute.

3. The method of claim 2 wherein the solute is a polymer.

4. The method of claim 3 wherein the polymer is a polydimethylsiloxane.

5. The method of claim 3 wherein the polymer is a polystyrene.

6. The method of claim 3 wherein the solute is selected from the group comprising polyethylene, propylene and butylene.

7. The method of claim 2 wherein the solute includes a surfactant in the HLB range between 0 and 12.

8. The method of claim 2 further comprising the step of selecting the components of the non-aqueous mixture so that the plugging agent is homogenous at the temperature and pressure conditions in the vicinity of the injection well perforations.

9. The method of claim 2 further comprising the step of selecting the components of the non-aqueous mixture so that the plugging agents is inhomogeneous at the temperature and pressure conditions a predetermined distance from the injection well perforations.

10. The method of claim 1 further comprising the step of adding a surfactant to the aqueous displacement fluid prior to dispersing the plugging agent in the displacement fluid.

11. The method of claim 10 wherein the displacement fluid surfactant is in the HLB range between 7 and 20.

12. The method of claim 1 wherein the aqueous displacement fluid is an acid solution.

* * * * *